(12) United States Patent
Chan et al.

(10) Patent No.: US 7,965,913 B2
(45) Date of Patent: Jun. 21, 2011

(54) OPTICAL STAR COUPLER

(75) Inventors: Eric Y. Chan, Mercer Island, WA (US); Dennis G. Koshinz, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/101,827

(22) Filed: Apr. 11, 2008

(65) Prior Publication Data

US 2009/0257716 A1    Oct. 15, 2009

(51) Int. Cl.
G02B 6/26 (2006.01)
G02B 6/42 (2006.01)

(52) U.S. Cl. ............................. 385/46; 385/47
(58) Field of Classification Search .................. 385/15, 385/18, 20, 22, 39, 46–48
See application file for complete search history.

(56) References Cited

U.S. PATENT DOCUMENTS

| | | | |
|---|---|---|---|
| 3,883,223 A | | 5/1975 | Hudson |
| 4,285,570 A | * | 8/1981 | Minemura et al. ............... 385/46 |
| 4,330,171 A | * | 5/1982 | Malsot et al. .................... 385/80 |
| 4,365,864 A | * | 12/1982 | Cowley et al. ................... 385/46 |
| 4,828,359 A | * | 5/1989 | Ueba et al. ..................... 385/123 |
| 5,018,821 A | * | 5/1991 | Kurata ............................ 385/72 |
| 5,071,213 A | | 12/1991 | Chan |
| 5,742,717 A | * | 4/1998 | Saitoh ............................. 385/46 |
| 5,896,481 A | | 4/1999 | Beranek et al. |
| 6,704,515 B1 | | 3/2004 | Chan et al. |
| 6,873,780 B2 | | 3/2005 | Chan et al. |
| 2004/0202426 A1 | * | 10/2004 | Hill ................................. 385/39 |
| 2005/0105854 A1 | | 5/2005 | Dong et al. |
| 2005/0123262 A1 | * | 6/2005 | Dowd et al. .................... 385/135 |
| 2005/0129367 A1 | | 6/2005 | Koshinz et al. |
| 2006/0228078 A1 | | 10/2006 | Chan et al. |
| 2007/0036498 A1 | | 2/2007 | Cianciotto |
| 2008/0219623 A1 | * | 9/2008 | Sklarek et al. .................. 385/46 |

FOREIGN PATENT DOCUMENTS

| | | |
|---|---|---|
| DE | 4033932 A * | 4/1992 |
| DE | 19728388 A1 * | 1/1999 |
| EP | 0525743 | 2/1993 |
| JP | 04 026804 | 1/1992 |
| JP | 06-324229 | 11/1994 |
| JP | 08 220399 | 8/1996 |
| WO | WO 2007/006317 | 1/2007 |
| WO | WO 2007/006317 A2 * | 1/2007 |

OTHER PUBLICATIONS

Search Report from EPO on co-pending EP application (09250899.3) dated Aug. 12, 2009.

* cited by examiner

*Primary Examiner* — Ryan Lepisto
*Assistant Examiner* — Robert Tavlykaev
(74) *Attorney, Agent, or Firm* — Yee & Associates, P.C.

(57) ABSTRACT

A plastic optical fiber (POF) based reflective star coupler is provided. The POF based reflective star coupler comprises a hollow cylindrical holding tube for receiving a plurality of plastic optical fibers (POF) at a front end of the holding tube and a mixing rod at a rear end of the holding tube; wherein a rear end of each POF is affixed to a front surface of the mixing rod; a rear convex surface of the mixing rod is coated with a highly reflective coating; and where the POFs, the mixing rod, and the holding tube are made from similar material, having similar refractive index and material properties.

18 Claims, 5 Drawing Sheets

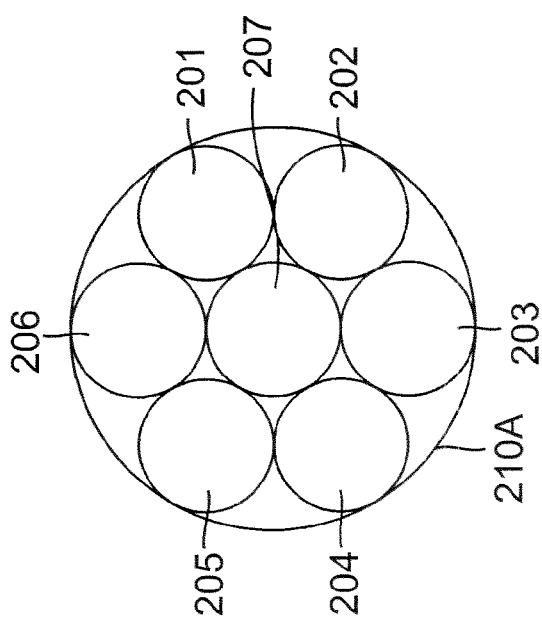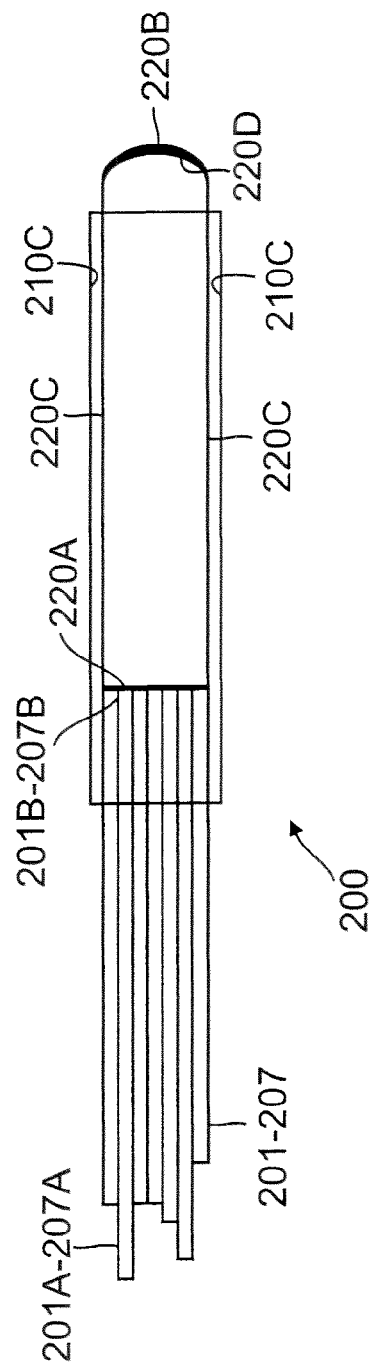
FIG. 2C
FIG. 2B

OPTICAL STAR COUPLER

TECHNICAL FIELD

The present disclosure generally relates to optical devices, and more particularly to an optical star coupler.

BACKGROUND

Aircrafts and space vehicles including military aircrafts are increasingly using optical fibers for communications, weaponry, and other systems. An optical star coupler forms an integral part of an optical transmission network.

A star coupler is a device that takes an input signal and splits it into equal output signals. Conventional star couplers typically use glass optical fibers (GOFs). It is inefficient to use such GOF based star coupler in plastic optical fiber based data network architecture. Use of different materials, i.e. plastic optical fiber (POF) and glass optical fiber, having different diameter, optical characteristics and refractive index in a network architecture results in large coupling loss. To ensure optimum coupling efficiency, it is preferred that data network architecture uses fibers and couplers of similar material with closely matched optical characteristics and refractive index.

Due to differences in the physical and material characteristics of GOFs and POFs, the method of making GOF based star coupler may not be used for making a POF based coupler. Continuous efforts are being made for optimum and cost effective design of star couplers.

SUMMARY

In one embodiment, a plastic optical fiber (POF) based reflective star coupler is provided. The POF based reflective star coupler comprises a hollow cylindrical holding tube for receiving a plurality of plastic optical fibers (POF) at a front end of the holding tube and a mixing rod at a rear end of the holding tube; wherein a rear end of each POF is affixed to a front surface of the mixing rod; a rear convex surface of the mixing rod is polished and coated with a highly reflective coating to form a convex reflective surface; and where the POFs, the mixing rod, and the holding tube are made from similar material, having similar refractive index and material properties.

In another embodiment, a method of making a reflective star coupler is provided. The method comprises inserting a plurality of plastic optical fibers (POFs) in a holding tube; forming a mixing rod having a convex polished rear surface, and coating the rear surface of the mixing rod with a highly reflective material; affixing a rear end of each plastic optical fiber with a front surface of the mixing rod, inside the holding tube; affixing the POFs and the mixing rod to the inside of the holding tube using an epoxy resin; and encasing the holding tube with the affixed POFs and the mixing rod in a hermetic seal package.

In yet another embodiment, an apparatus comprising a star coupler is provided. The star coupler includes a hollow cylindrical holding tube for receiving a plurality of plastic optical fibers (POF) at a front end of the holding tube and a mixing rod at a rear end of the holding tube; wherein a rear end of each POF is affixed to a front surface of the mixing rod; a rear convex surface of the mixing rod is polished and coated with a highly reflective coating to form a convex reflective surface; and where the POFs, the mixing rod and the holding tube are made from similar material, having similar refractive index and material properties.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 2B is a schematic sectional view of a plastic optical fiber (POF) based star coupler, according to one embodiment;

FIG. 2C shows a side plan view of the optical star coupler of FIG. 2B;

DETAILED DESCRIPTION

Figure 1:
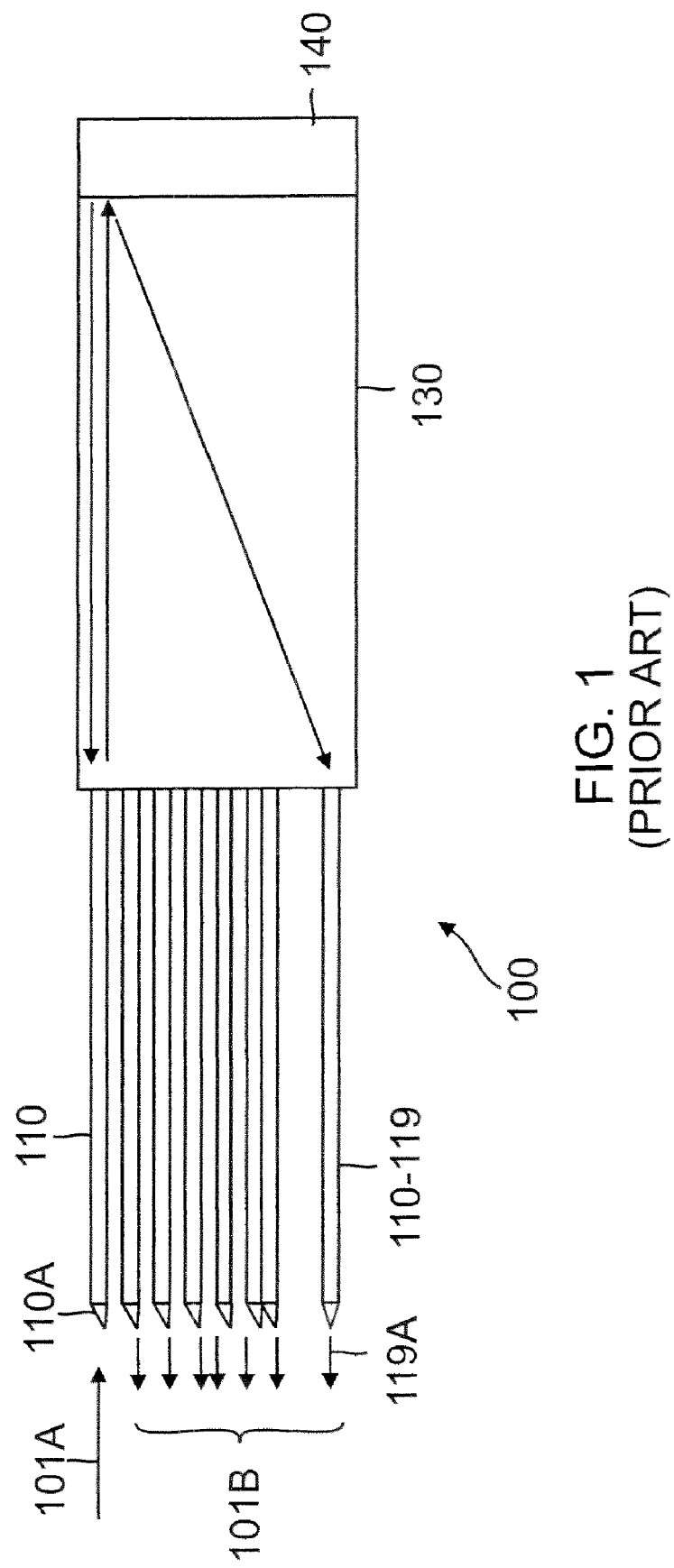
FIG. 1 is a schematic structure of a glass optical fiber based star coupler.

In the detailed description that follows, the present embodiments are described with reference to the drawings. In the drawings, elements of the present embodiments are labeled with reference numbers, these reference numbers are reproduced below in connection with the discussion of the corresponding drawing features.

To facilitate an understanding of an optical star coupler, a general overview of a star coupler will be described. The specific components of the optical star coupler of the present disclosure will then be described with specific reference to general structure of a star coupler.

FIG. 1 shows a conventional star coupler 100 using glass based optical fibers. Star coupler 100 is fabricated by fusing a plurality of glass optical fibers (GOFs)(110-119). A rear end of these GOFs is melted together at a high temperature to form a mixing section 130. A reflector 140 is mounted on a front end of the mixing section 130. A front end of each of the GOF (110-119) is connected to a fiber connector (110A-119A). An input signal (for example 101A) received at one GOF (for example, 110), through connector 110A, propagates through the mixing section 130, and then is reflected by the reflector 140. The reflected signal passes through the mixing portion 130, and is distributed as an output signal intended for the remaining optical fibers (for example, 111 . . . 119).

As described above, it is inefficient to use such GOF based star coupler in plastic optical fiber based data network architecture. Due to differences in the physical and material characteristics of GOFs and POFs, the method of making GOF based star coupler may not be used for making a POF based coupler.

The current disclosure provides a plastic optical fiber (POF) based optical coupler (also referred to as reflective star coupler) that may efficiently be used in a POF based network architecture. The current disclosure also provides a method for manufacturing a POF based reflective star coupler.

Plastic optical fibers (also referred to as "POF" or "POFs") exhibit high transmission capacity, have excellent electromagnetic interference (EMI) noise immunity, are light weight, have high mechanical strength and have outstanding flexibility. Due to these properties, POF is used in data communications, as well as decoration, illumination, and similar industrial applications. POF is also larger in diameter as compared to a GOF. Due to its larger diameter, POF exhibits much greater tolerance to fiber misalignment than GOF. Because of this large misalignment tolerance, POF based fiber optic networks have lower maintenance and installation costs. In aerospace platforms POF also greatly reduces the cost of connectors and transceiver components used in an avionics network.

Figure 2A:
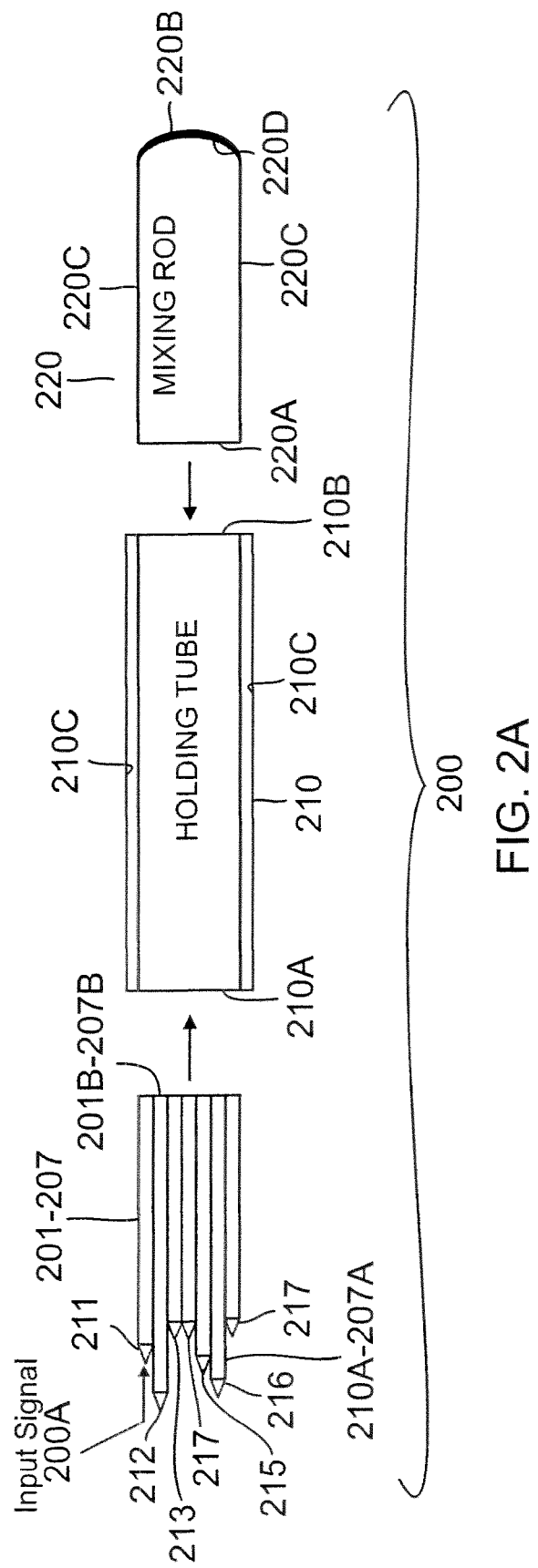
FIG. 2A is an exploded view of the components of an optical star coupler, according to one embodiment.

FIG. 2A shows an exploded view of the structure of a reflective star coupler 200. Reflective star coupler 200 includes a hollow cylindrical holding tube 210 that receives a plurality of POFs 201-207, and a mixing rod 220 with a highly reflective coating at one end forming a concave mirror 220D to reflect an input signal as described below in detail. The plurality of POFs 201-207 are affixed to the front surface 220A of mixing rod 220. POFs 201-207 may be manufactured from Polymethyl-methacrylate (PMMA). An input signal 200A enters a POF (e.g. 211), propagates through mixing rod 220, and is reflected by the concave mirror 220D.

The hollow cylindrical holding tube 210 includes a front end 210A and a rear end 210B. The plurality of POFs are inserted at the front end 210A of the holding tube 210. The holding tube 210 is made from a UV (ultra-violet) transparent material that has similar characteristics to the POFs. In one embodiment, the holding tube 210 is made from aluminum oxynitride (AlON). AlON has excellent durability and mechanical strength and is suitable for use in extreme aerospace environments. It is to be understood that materials exhibiting similar properties as AlON may alternatively be used for making the holding tube 210.

The POFs (201-207) are tightly packed in the holding tube 210 so that there is minimum vacant space between the fibers (see FIG. 2C). The tight fit between the POFs (201-207) ensures that optical signal propagation occurs with minimum loss. The number of POFs (201-207) packed in the holding tube 210 depends on the diameter of fibers used, and diameter of the holding tube 210. In one embodiment, holding tube 210 of 3 mm diameter may optimally hold seven POFs of 1 mm each.

Each POF (201-207) includes a front end (201A-207A) and a rear end (201B-207B). The front end (201A-207A) of each POF (201-207) is terminated with a fiber connector (211-217) which facilitates the reception and transmission of signal to/from the reflective star coupler 200 for connection to another POF, light source or receivers, test equipment, etc.

The rear ends 201B-207B of the POFs 201-207 packed in the holding tube 210 are affixed to a front surface 220A of mixing rod 220. The mixing rod 220 is inserted from the rear end 210B of the holding tube 210. The mixing rod 220 is also manufactured from a plastic optical fiber material having similar dimensions as the inner diameter of the holding tube 210. The mixing rod 220 may be a PMMA fiber. In one embodiment, mixing rod 220 is approximately 14 cm long with a 3 mm diameter. The mixing rod 220 enables uniform mixing of the input and output signal. Length of the mixing rod 220 is proportional to the length of the holding tube 210, the POFs (201-207) and the final configuration of the reflective star coupler 200.

The rear surface 220B of mixing rod is polished and coated with a high reflective coating. In one embodiment, the rear surface 220B is coated with dielectric or metal based coating. The reflective coating on surface 220B provides a concave mirror (220D) used for reflecting the input signal 200A. A high reflective coating on the rear surface 220B of the mixing rod 220 ensures that there is minimum or no leakage of optical rays (or signal) from the star coupler.

The outer edges 220C of the mixing rod 220 are bonded to the inner surfaces 210C of the holding tube 210. A conventional adhesive, such as epoxy resin, may be used for bonding the mixing rod to the inner surface of the holding tube 210. In one embodiment, a space grade UV epoxy may be used as an adhesive. POF 201-207 may be affixed to mixing rod 220 using epoxy resin.

FIG. 2B shows a sectional view of the assembly of POF based reflective star coupler 200.

Figure 3:
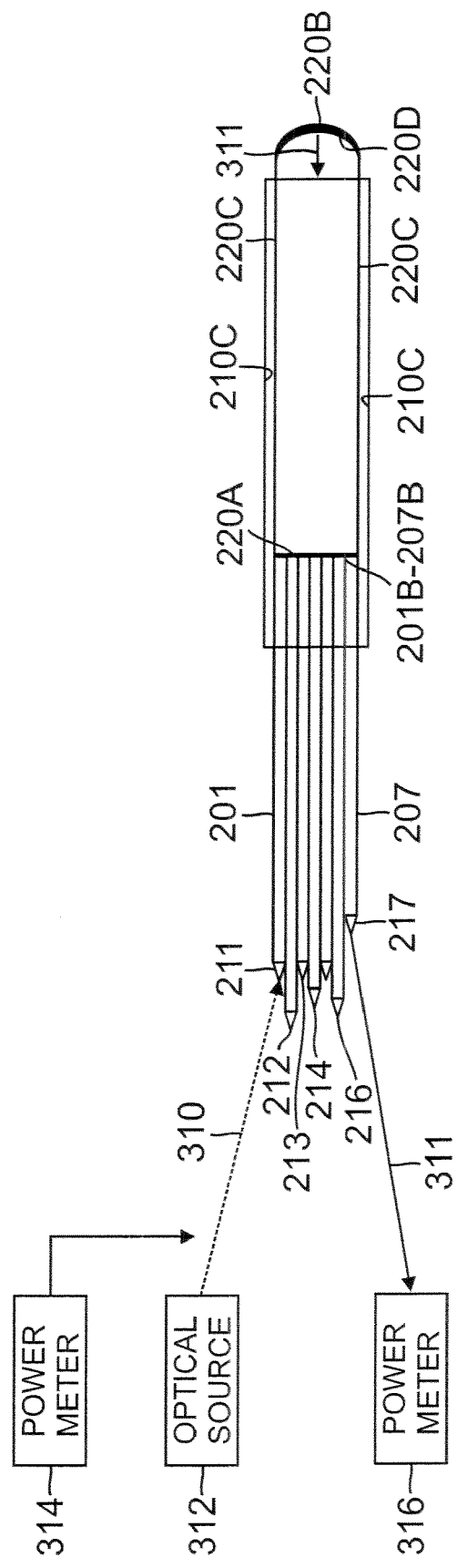
FIG. 3 shows an experimental set-up for testing the strength of signal transmitted by an optical star coupler of the present disclosure.

FIG. 3 shows an experimental set-up for testing the strength of an optical signal (310) transmitted using the reflective star coupler 200. A fiber connector 211 of a POF 201 is connected to an optical source 312 that provides an input signal 310. A power meter 314 monitors the strength of the input signal 310. Signal 310 via POF 201, propagates through the mixing rod 220 and is reflected by the concave mirror 220D. The reflected signal 311 passes through the mixing rod 220, and is distributed as an output signal intended for the remaining POFs 202-207. In this reflective star coupler configuration, any fiber from 201 to 207 can be the input fiber with the rest as output fibers. The strength of the output signal 311 is then tested using another power meter 316. In one embodiment, the POF based reflective star coupler efficiently and uniformly transmits an optical signal with minimal loss of signal strength during signal transmission.

Figure 4:
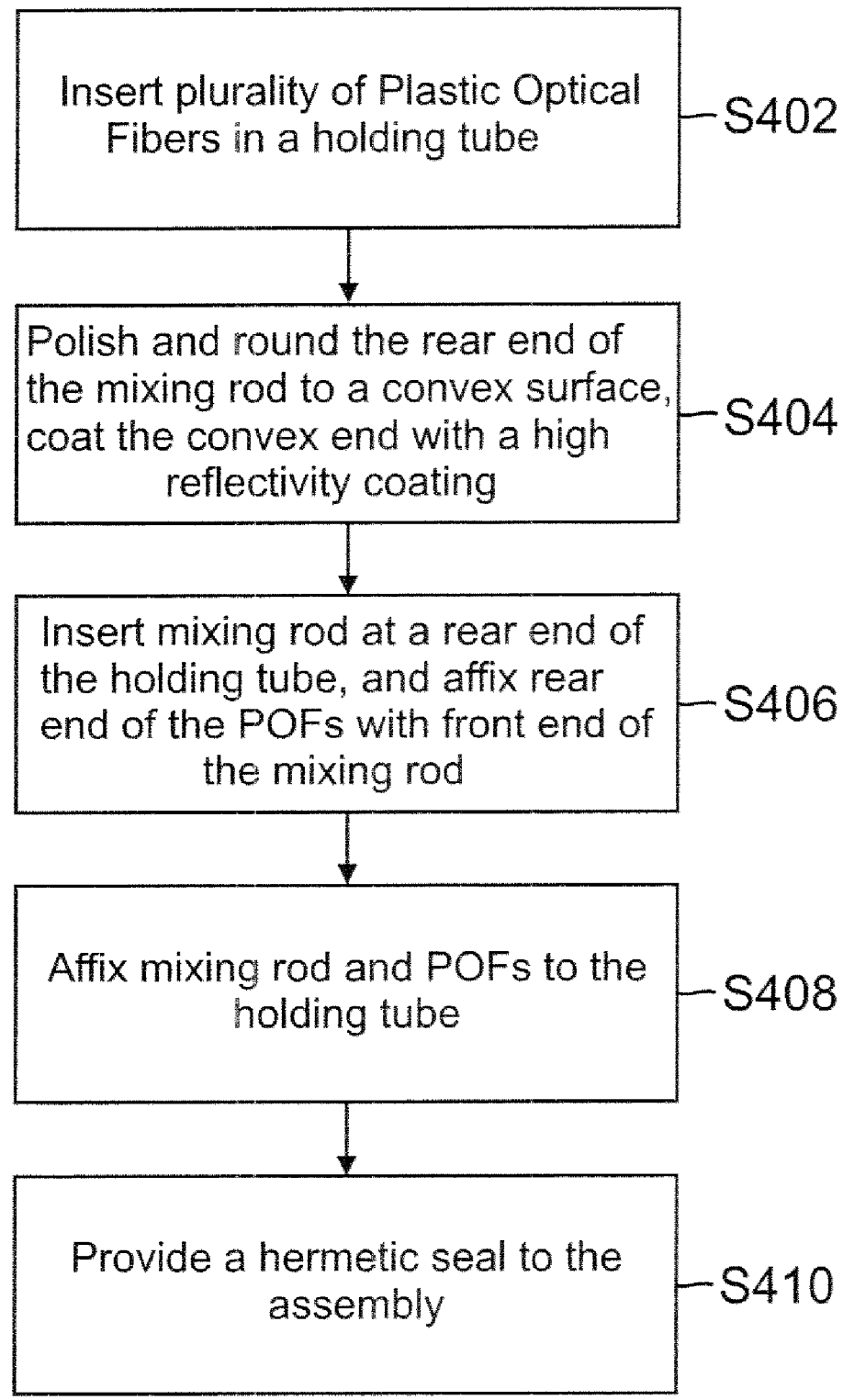
FIG. 4 shows a process flow diagram for preparing optical star coupler, according to one embodiment.

FIG. 4 outlines the process steps for preparing a reflective star coupler. In step S402, a plurality of optical fibers (for example, 201-207) are inserted at the front end 210A of the holding tube 210. In step S404, the rear end of the mixing rod 220 is polished and rounded to form a convex surface. The rounded convex surface is coated with a highly reflective material to form concave mirror 220D.

In step S406, mixing rod 220 is inserted into holding tube 210, and rear end (201B-207B) of the optical fibers (201-207) are affixed to the front surface 220A of the mixing rod 220. In one embodiment, space grade epoxy may be used to affix the POFs.

In step S408, the outer edges 220C of the mixing rod 220 and POFs (201-207) are affixed to an inner surface 210C of the holding tube 210. In step S410, the reflective star coupler is hermetically sealed.

Embodiments of the present POF based reflective star coupler 200 enable formation of a data network architecture primarily using plastic optical fibers. The mixing rod 220, the plurality of POFs 201-207, and the holding tube 210 are all made from similar materials having similar refractive index and similar material characteristics. The adhesive, epoxy resin, for affixing the mixing rod 220, the POFs (201-207) and the holding tube 210, also have similar refractive index and material properties as the other components of the reflective star coupler 200, which substantially reduces the coupling loss with high strength and reliability for avionics applications.

Further, the use of the mixing rod 220 with concave surface 220D, and an outer convex surface 220B, ensures that an input signal is properly reflected with minimum or no signal loss due to leakage from the ends of the mixing rod. The use of a mixing rod with a concave reflective surface allows for a shorter and more compact POF star coupler.

In another embodiment, the reflective star coupler 200 is used with bi-directional POF transceivers (not shown). Bi-directional transceiver uses only one fiber for transmit and receive functions. Bi-directional transceiver combines with the reflective star coupler 200 and substantially reduces the size, weight and cost of avionics fiber optic network architecture.

It will be appreciated from the foregoing description that the disclosed invention and its equivalents can be implemented in a variety of forms. Therefore, while the invention has been described in connection with specific embodiments, the true scope of the disclosure should be limited not by the specific embodiments described herein, but rather by the claims that follow and any equivalents thereof that may suggest themselves to those skilled in the pertinent arts.

We claim:

1. A plastic optical fiber (POF) based reflective star coupler, comprising:
   a holding tube for receiving a plurality of plastic optical fibers (POFs) at a front end of the holding tube and a mixing rod at a rear end of the holding tube, wherein the holding tube is hollow and cylindrical, wherein the mixing rod is configured to uniformly mix a signal from at least one plastic optical fiber of a plurality of input plastic optical fibers, and wherein the mixing rod is configured to reflect the signal to a remaining number of plastic optical fibers of the plurality of input plastic optical fibers;
   wherein an inner diameter of the holding tube is substantially close to an outer diameter of the mixing rod and a second outer diameter of the plurality of plastic optical fibers, wherein a number of the plurality of plastic optical fibers depends on the inner diameter of the holding tube;
   wherein the plurality of plastic optical fibers and the mixing rod fit tightly within the holding tube without having to fuse the plurality of plastic optical fibers to each other in a bundle;
   wherein a rear end of each plastic optical fiber of the plurality of plastic optical fibers is affixed to a front surface of the mixing rod;
   a rear convex surface of the mixing rod is polished and coated with a highly reflective coating to form a convex reflective surface; and
   wherein the plurality of plastic optical fibers, the mixing rod, and the holding tube are made from same materials, having same refractive indices and material properties for reducing any signal loss during signal transmission through the plurality of plastic optical fibers.

2. The reflective star coupler of claim 1, wherein an outer diameter of the mixing rod conforms to the inner diameter of the holding tube.

3. The reflective star coupler of claim 1, wherein the mixing rod is affixed to an inner surface of the holding tube using a space grade ultraviolet epoxy.

4. The reflective star coupler of claim 1, wherein the plurality of plastic optical fibers are affixed to an inner surface of the holding tube using a space grade ultraviolet epoxy.

5. The reflective star coupler of claim 1, wherein the mixing rod is made of Polymethyl-methacrylate (PMMA).

6. The reflective star coupler of claim 1, wherein the reflective coating at the rear surface of the mixing rod provides a concave mirror to reflect an input signal.

7. The reflective star coupler of claim 1, wherein the holding tube with the plurality of plastic optical fibers and the mixing rod is encased in a hermetic seal package.

8. A method of making a reflective star coupler, comprising:
   inserting a plurality of plastic optical fibers (POFs) in a holding tube, wherein the holding tube is hollow and cylindrical;
   forming a mixing rod having a convex polished rear surface, and coating the rear surface of the mixing rod with a highly reflective material, wherein the mixing rod is configured to uniformly mix a signal from at least one plastic optical fiber of a plurality of input plastic optical fibers, and wherein the mixing rod is configured to reflect the signal from at least one plastic optical fiber of the plurality of plastic optical fibers to a remaining number of plastic optical fibers of the plurality of input plastic optical fibers;
   affixing a rear end of each plastic optical fiber with a front surface of the mixing rod, inside the holding tube;
   affixing the plurality of plastic optical fibers and the mixing rod to the inside of the holding tube using an epoxy resin; and
   encasing the holding tube with the plurality of plastic optical fibers and the mixing rod in a hermetic seal package;
   wherein an inner diameter of the holding tube is similar to an outer diameter of the mixing rod, and a number of the plurality of plastic optical fibers depend on the holding tube inner diameter;
   wherein the plurality of plastic optical fibers and the mixing rod fit tightly within the holding tube without having to fuse the plurality of plastic optical fibers; and
   wherein the plurality of plastic optical fibers, the mixing rod, and the holding tube are made from same materials, having same refractive indices and material properties for reducing any signal loss during signal transmission through the plurality of plastic optical fibers.

9. The method of claim 8, further comprising making the plurality of plastic optical fibers, the epoxy resin, the mixing rod and the holding tube from similar materials, having similar refractive indices and similar material properties.

10. The method of claim 8, wherein the outside diameter of the mixing rod conforms to the inner diameter of the holding tube.

11. The method of claim 8, further comprising affixing the mixing rod to an inner surface of the holding tube using a space grade ultraviolet epoxy.

12. The method of claim 8, further comprising affixing the plurality of plastic optical fibers to an inner surface of the holding tube using a space grade ultraviolet epoxy.

13. The method of claim 8, further comprising manufacturing the mixing rod from Polymethyl-methacrylate (PMMA).

14. The method of claim 8, wherein the reflective coating at the rear surface of the mixing rod provides a concave mirror to reflect an input signal.

15. An apparatus comprising:
   a star coupler, wherein the star coupler comprises holding tube for receiving a plurality of plastic optical fibers (POFs) at a front end of the holding tube and a mixing rod at a rear end of the holding tube, wherein the holding tube is hollow and cylindrical, wherein the mixing rod is configured to uniformly mix a signal from at least one plastic optical fiber of a plurality of input plastic optical fibers, and wherein the mixing rod is configured to reflect the signal from at least one plastic optical fiber of the plurality of plastic optical fibers to a remaining number of plastic optical fibers of the plurality of input plastic optical fibers;
   wherein an inner diameter of the holding tube is similar to an outer diameter of the mixing rod, and a number of the plurality of plastic optical fibers depend on the holding tube inner diameter;

wherein the plurality of plastic optical fibers and the mixing rod fit tightly within the holding tube without having to fuse the plurality of plastic optical fibers; and wherein a rear end of each POF is affixed to a front surface of the mixing rod; a rear convex surface of the mixing rod is polished and coated with a highly reflective coating to form a convex reflective surface; and wherein the plurality of plastic optical fibers, the mixing rod and the holding tube are made from same materials, having same refractive indices and material properties for reducing any signal loss during signal transmission through the plurality of plastic optical fibers.

16. The apparatus of claim 15, wherein an outside diameter of the mixing rod conforms to the inner diameter of the holding tube.

17. The apparatus of 15, wherein the reflective coating at the rear surface of the mixing rod provides a concave mirror to reflect an input signal.

18. The apparatus of 15, wherein the holding tube with the plurality of plastic optical fibers and the mixing rod is encased in a hermetic seal package.

* * * * *